US 8,099,440 B2

(12) United States Patent
Johnson et al.

(10) Patent No.: US 8,099,440 B2
(45) Date of Patent: Jan. 17, 2012

(54) METHOD FOR LAYING OUT FIELDS IN A DATABASE IN A HYBRID OF ROW-WISE AND COLUMN-WISE ORDERING

(75) Inventors: F. Ryan Johnson, Lindon, UT (US); Vijayshankar Raman, Sunnyvale, CA (US); Frederick R. Reiss, Sunnyvale, CA (US); Richard S. Sidle, Mountain View, CA (US); Garret F. Swart, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 432 days.

(21) Appl. No.: 12/192,504

(22) Filed: Aug. 15, 2008

(65) Prior Publication Data

US 2010/0042587 A1 Feb. 18, 2010

(51) Int. Cl.
*G06F 7/00* (2006.01)
(52) U.S. Cl. ...................................................... 707/802
(58) Field of Classification Search .................. 707/802, 707/713
See application file for complete search history.

(56) References Cited

U.S. PATENT DOCUMENTS

| | | | |
|---|---|---|---|
| 5,794,228 A | | 8/1998 | French et al. |
| 5,794,229 A | | 8/1998 | French et al. |
| 5,819,282 A | * | 10/1998 | Hooper et al. ........................ 1/1 |
| 5,917,771 A | * | 6/1999 | Hill .......................... 365/230.03 |
| 5,918,225 A | | 6/1999 | White et al. |
| 6,018,738 A | | 1/2000 | Breese et al. |
| 6,049,630 A | | 4/2000 | Wang et al. |
| 6,161,105 A | | 12/2000 | Keighan et al. |
| 6,309,424 B1 | | 10/2001 | Fallon |
| 6,510,505 B1 | * | 1/2003 | Burns et al. .................... 711/170 |
| 6,661,839 B1 | | 12/2003 | Ishida et al. |
| 7,062,541 B1 | | 6/2006 | Cannon et al. |
| 7,111,094 B1 | | 9/2006 | Liu et al. |
| 7,239,754 B2 | | 7/2007 | Akimoto et al. |
| 7,251,648 B2 | | 7/2007 | Chaudhuri et al. |
| 7,339,501 B2 | | 3/2008 | Ban et al. |
| 7,440,963 B1 | * | 10/2008 | Bello et al. ............................ 1/1 |
| 7,466,742 B1 | | 12/2008 | Srinivasan |
| 7,469,266 B2 | * | 12/2008 | Gustavson et al. ........... 708/520 |
| 7,711,736 B2 | | 5/2010 | Levin |

(Continued)

OTHER PUBLICATIONS

Kistler et al., "Automated Data-Member Layout of Heap Objects to Improve Memory-Hierarchy Performance," ACM Transactions on Programming Languages and Systems, vol. 22, No. 3, May 2000, pp. 490-505.

(Continued)

*Primary Examiner* — Kimberly Lovel
*Assistant Examiner* — Mohammed R Uddin
(74) *Attorney, Agent, or Firm* — IP Authority, LLC; Ramraj Soundararajan

(57) ABSTRACT

A method, system, and article are provided for employment of a hybrid layout of representation of data objects in computer memory. Columns of the database are separated based upon a classification of the columns. A vertical partition in the form of a bank is provided to receive an assignment of one or more data objects identified in the columns. Each bank is sized to be a divisor of a size of an associated hardware register. Assignment of data objects to banks organizes the data in a manner that support efficient query processing that mitigates the quantity of banks required to respond to the query.

20 Claims, 7 Drawing Sheets

U.S. PATENT DOCUMENTS

| | | | |
|---|---|---|---|
| 7,739,275 B2 | 6/2010 | Dubinko et al. | |
| 2004/0062435 A1* | 4/2004 | Yamaoka et al. | 382/159 |
| 2004/0148482 A1* | 7/2004 | Grundy et al. | 711/167 |
| 2005/0055367 A1 | 3/2005 | Vo et al. | |
| 2005/0060300 A1* | 3/2005 | Stolte et al. | 707/3 |
| 2005/0071409 A1* | 3/2005 | Gustavson et al. | 708/514 |
| 2005/0125476 A1* | 6/2005 | Symes et al. | 708/524 |
| 2005/0187977 A1* | 8/2005 | Frost | 707/104.1 |
| 2005/0192994 A1 | 9/2005 | Caldwell et al. | |
| 2005/0198473 A1* | 9/2005 | Ford | 712/221 |
| 2006/0149938 A1* | 7/2006 | Jiang et al. | 712/225 |
| 2006/0233257 A1 | 10/2006 | Keith et al. | |
| 2006/0251330 A1 | 11/2006 | Toth et al. | |
| 2007/0043531 A1* | 2/2007 | Kosche et al. | 702/182 |
| 2008/0059492 A1* | 3/2008 | Tarin | 707/100 |
| 2008/0201336 A1* | 8/2008 | Yamato | 707/10 |
| 2008/0294676 A1 | 11/2008 | Faerber et al. | |
| 2008/0294863 A1 | 11/2008 | Faerber et al. | |
| 2010/0030796 A1 | 2/2010 | Netz et al. | |

OTHER PUBLICATIONS

Rabbah et al., "Data Remapping for Design Space Optimization of Embedded Memory Systems," ACM Transactions on Embedded Computing Systems, vol. 2, No. 2, May 2003, pp. 186-218.

Larsson, "The Context Trees of Block Sorting Compression," Proceedings of the IEEE Data Compression Conf., Snowbird, UT, Mar. 30-Apr. 1, 1998, 10pgs.

Huang et al., "Windowed Huffman Coding Algorithm with Size Adaptation," IEEE Proceedings-I, V140, N2, Apr. 1993, pp. 109-113.

"Effective INTER-Parallel Schemes for Compression/Decompression Speed-up," IBM TDB, V40, N4, Apr. 1997, pp. 157-165.

"Maximum Entropy Method of Data Encoding for Dictionaries and Texts," IBM TDB, V33, N6B, Nov. 1990, pp. 45-46.

* cited by examiner

METHOD FOR LAYING OUT FIELDS IN A DATABASE IN A HYBRID OF ROW-WISE AND COLUMN-WISE ORDERING

BACKGROUND OF THE INVENTION

1. Technical Field

This invention relates to organization of data in a database. More specifically, the invention introduces a hybrid layout for data in the database that supports an efficient block oriented query processing.

2. Description of Related Art

A database is a collection of information organized in such a way that a computer program can quickly and efficiently select desired pieces of data. It is known in the art that data are distinct pieces of formatted information. In electronic form, data are bits and bytes stored in electronic memory. Traditional databases are organized by fields, records, and files. A field is a piece of information; a record is one complete set of fields; and a file is a collection of records. To access information from a database, a program in the form of a database management system is employed.

Computer hardware does not directly support the concept of multidimensional arrays. Computer memory is one-dimensional, providing memory addresses that start at zero and increase serially to the highest available location. Multidimensional arrays are therefore a software concept that maps the elements of a multi-dimensional array into a contiguous linear span of memory addresses. There are two ways that such an array can be represented in one-dimensional linear memory. These two options, which are explained below, are commonly called row-major and column-major. All programming languages that support multidimensional arrays choose from one of these two possibilities.

Column-major is a manner of contiguously storing all elements of the first dimension of an array in memory. As you move linearly through the memory in such an array, the first dimension changes the fastest. However, there are issues that arise with query processing associated with the column major structure. Columns are often not aligned with register boundaries of modern processors. A hardware register is a high speed storage area within a central processing unit. All data must be represented in a register before it can be processed. In one embodiment, the register can contain the address of a memory location where data is stored rather than the actual data itself. Most modern processors have one or more 64, bit registers, and some have 128, bit registers. However, column-major data represented in the registers commonly do not occupy the size of the register.

Conversely, row-major is a manner of contiguously storing all elements of the second dimension of an array in memory. In the row-major structure, as you move linearly through the memory, the second dimension changes the fastest. However, there are issues that arise with query processing of the row-major structure as well. In the current state of the art, a query executor must touch every field of each row, even if the query only touches some fields. Accordingly, processing a query in a row-major structure requires processing of extraneous data.

Recent practice developments for data warehouses store tables in compressed form in main memory. Accessing the table is costly due to predicate evaluation, wherein a predicate is a logical operator that returns either true or false as answers. Examples of predicates include, but are not limited to, AND, OR, NOR, XOR, etc. Organizing the tables stored in main memory in either the row-major or the column-major format is not optimal. A row-major format requires queries to scan columns that are not necessary for the query. Similarly, efficient query processing of the column-major format requires the columns to be padded to word boundaries as the columns are frequently not aligned with register boundaries.

Accordingly, there is a need for organizing the structure of the table format that efficiently responds to query processing.

SUMMARY OF THE INVENTION

This invention comprises a method and article for converting a collection of multi-attribute data objects into a representation, and processing a query responsive to the converted representation.

In one aspect of the invention, a method is provided for representing a database of multiple data objects on computer memory. A data object with multiple attributes is separated into at least two parts. In one embodiment, the separation is based upon the columns of a database table. Attributes of the objects are organized into at least two separate banks, with the bank being a vertical partition containing a subset of the attributes. Each bank is sized as a divisor of a machine register size. The separated parts of the objects are stored in the at least two separate banks.

In another aspect of the invention, an article is provided to represent a database of multiple data objects on computer memory. A computer-readable carrier is provided with computer program instructions configured to process a query responsive to the configuration. Instructions are provided to separate a data object with multiple attributes into at least two parts. In addition, instructions are provided to organize attributes of the data objects into at least two separate banks. Each bank is a vertical partition containing a subset of the attributes. Instructions are provided to size each bank as a divisor of a machine register size, and to store the separated parts of the objects in the at least two separate banks.

Other features and advantages of this invention will become apparent from the following detailed description of the presently preferred embodiment of the invention, taken in conjunction with the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention unless otherwise explicitly indicated. Implications to the contrary are otherwise not to be made.

DESCRIPTION OF THE PREFERRED EMBODIMENT

Figure 1:
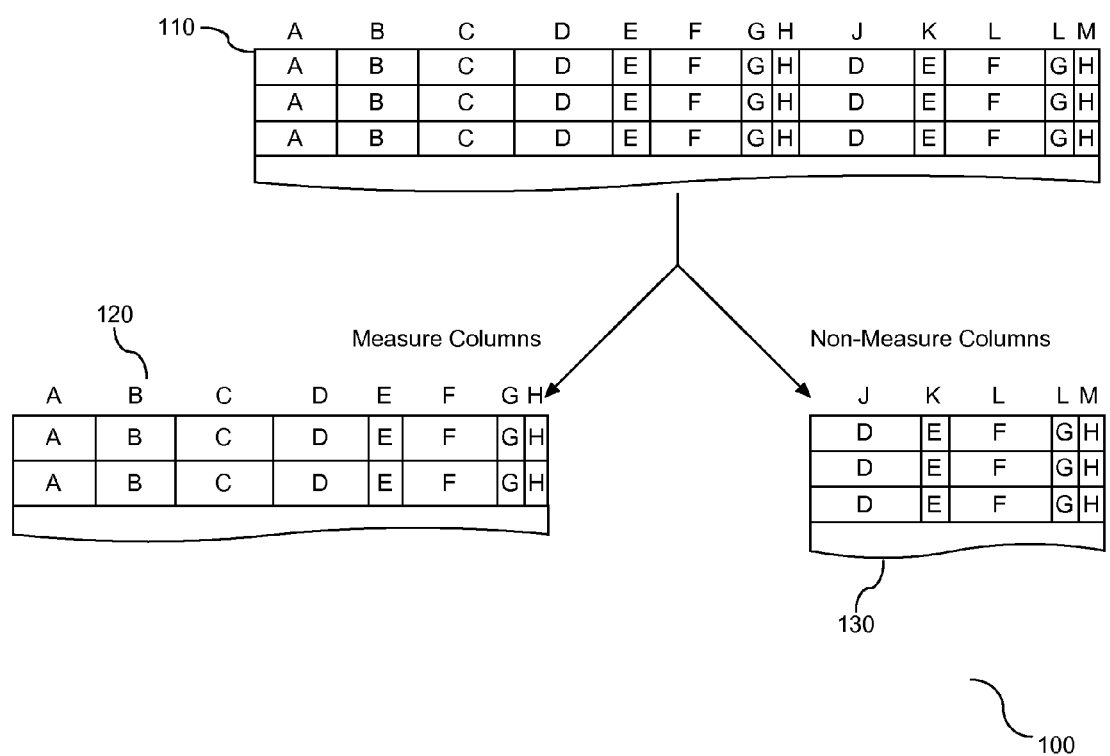
FIG. 1 is a block diagram illustrating separation of the columns of a database table.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but merely representative of selected embodiments of the invention.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

The illustrated embodiment of the invention will be best understood by reference to the drawings, wherein like part are designated by like numerals throughout. The following description is intended only by way of example, and simply illustrates certain select embodiments of devices, systems, and processes that are consistent with the invention as claimed herein.

Overview

The method, apparatus, and article of manufacture of the present invention provides valuable advantage over the prior art. According to the present invention, a hybrid layout of data in a database is created, wherein measure columns and non-measure columns are separated, with the non-measure columns assigned to vertical partition(s), also referred to herein as banks. Each bank is sized to be a divisor of a machine register size. One or more columns from the non-measure category of columns are assigned to each bank. Different algorithms may be employed for the assignment of columns to banks, including minimizing the quantity of banks, and mitigating the quantity of banks to respond to a query. Following the creation of the banks and assignment, a query may be executed on the data to extract one or more columns from the bank using a record identifier for each record that is the subject of the query.

Technical Details

In the following description, reference is made to the accompanying drawings that form a part hereof, and which is shown by way of illustration that specific embodiment in which the invention may be practiced. It is to be understood that other embodiments may be utilized because structural changes may be made without departing from the scope of the present invention.

In operation, a client machine in communication with the database stores data in or retrieves data from one or more database tables. Each table comprises one or more horizontal rows, also known as records, together with columns, also known as fields. The client issues one or more query commands to the server for retrieving particular data from the table. Similarly, the client may insert new rows of data records into the table, and modify or delete an existing record in the table.

The layout of the conventional database table is modified to create a hybrid layout of the table. This hybrid layout reorganizes the table entries into one or more banks. The hybrid layout employs the fact and dimension tables of a database to separate measure columns of the table from the non-measure columns of the table. A measure column is a column that is used by a query for aggregation and not for predicate evaluation or group-by processing. Columns accessed for aggregation and grouping are only accessed for each tuple that qualifies the query predicates. This category of columns is identified by their presence in a fact table of the database. Measure columns are laid out in row-major order. Conversely, a non-measure column is laid out in a vertical partition, hereinafter referred to as a bank. A non-measure column is identified by their presence in a dimension table of the database. The measure and non-measure columns represent different characteristics of the database table. Non-measure columns accessed for predicate evaluation are accessed once for each tuple. The non-measure columns are laid out in vertical partitions and placed into banks. Accordingly, the measure column is separated from the non-measure columns.

A bank represents a vertical partition containing a subset of the columns. Each bank is sized to be a divisor of a machine register size. It is known in the art that a register size is a multiple of the factor of eight up to the size of the register. For example, a 64, bit register will have the following divisors: 8, 16, 32, 64; and a 128, bit register will have the following divisors: 8, 16, 32, 64,, and 128. The storage within each bank is row-major. FIG. 1 is a block diagram (100) illustrating separation of the columns of a database table. More specifically, a table (110) is shown containing both measure columns (120) and non-measure columns (130). In this example, the measure columns (120) are identified as columns A though H and the non-measure (130) columns are identified as columns J through M. Accordingly, the first part of modifying the layout of the database table includes identifying and separating the measure columns and the non-measure columns.

The measure columns are grouped and divided into different banks. In one embodiment, columns A, B, and C are placed in bank$_1$, (140), columns D, E, and F in bank$_2$ (150), and columns G and H are placed in bank$_3$, (160). Since the storage within each bank is row major, the following is an example of the layout of bank$_2$:

<tuple__1.D> <tuple__1.E> <tuple__1.F> <tuple__2.D><tuple__2.E> <tuple__2.F> . . . , wherein a tuple is a record in the database system that may include one or more components. The columns are assigned to respective banks based upon the size of the columns and the size of the respective banks. Different aspects of assignment to banks are described in detail below. Accordingly, separation of the identified measure and non-measure columns into different banks provides processing efficiency.

Figure 2:
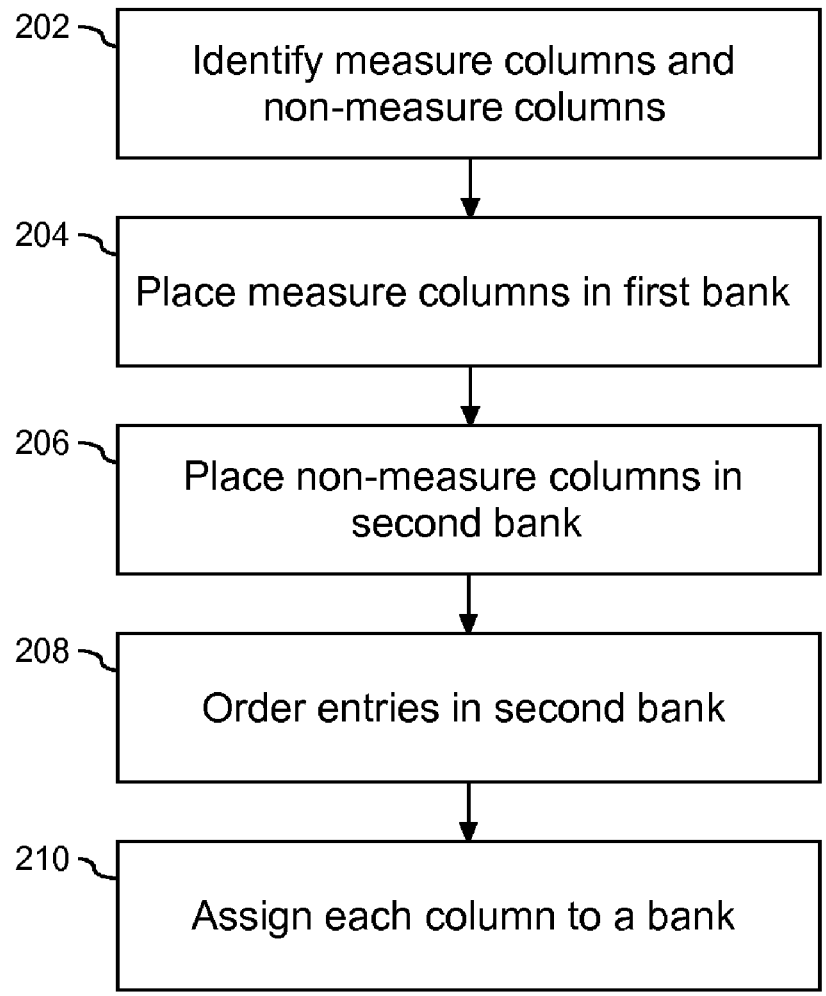
FIG. 2 is a flow chart illustrating a process for assignment of columns of the database table to banks.

As noted above, the banks are employed as a mechanism within the hybrid payout. Each bank organizes data attributes and each bank can have the same or different number of columns. In one embodiment, the same or related attributes are placed in the same bank. There is different logic and rules that may be applied with assignment of a column to a bank. For example, in one embodiment, columns that are frequently utilized in the same query are placed in the same bank. This enables a query that employs a small number of columns to limit the quantity of banks utilized to support the query. Similarly, in one embodiment, the non-measure columns are assigned to banks to minimize the number of banks needed to hold the columns. FIG. 2 is a flow chart (200) illustrating a process for separation and assignment of data objects of the database table to banks. Initially, the measure and non-measure columns of the table are separated. As noted above, these columns are defined by their separation into the fact and dimension tables of the database. The first step in the assignment process is to employ instructions to identify the measure columns and the non-measure columns in the table (202). In one embodiment, a heuristic is employed for the identification process. However, the invention should not be limited to a heuristic, as a variety of instructions may be employed for the identification process. Following step (202), the identified measure columns are placed in a first bank (204), and the identified non-measure columns are placed in a second bank (206). Following the placement of the columns into banks, each entry, i.e. data object, originating from the non-measure column is placed in an order based upon size with respect to the other entries (208). In one embodiment, the placement at step (208) is in ascending order from the smallest sized column to the largest sized column. However, the invention should not be limited to employment of an ascending algorithm. In one embodiment, the placement at step (208) may be in descending order from the largest sized column to the smallest sized column. Accordingly, the first part of organization of the hybrid layout is to identify and organize the identified non-measure columns and the data objects therein from the table.

Once the banks have been organized as outlined above, each of the data objects is assigned to a bank (210). There are several different embodiments that may be employed for the assignment at step (210). For example, data objects that are often combined to support a query may be placed in the same bank. In this example, the quantity of banks employed to support a query would be mitigated. There is a trade-off associated with the size of the banks. Wide banks are more compact than narrow banks because more data objects may be placed in a wide bank with efficient use of space. When a query references many of the data objects in a wide bank, the compact nature of the bank will result in efficient utilization of bandwidth. In one embodiment, the wide bank is comparable to a row-major layout. In contrast to a wide bank, a narrow bank may be efficient to support a query that employs only a few data objects within each bank. Accordingly, FIG. 2 illustrates reorganizing a table into a hybrid layout of vertical partitions.

Figure 3:
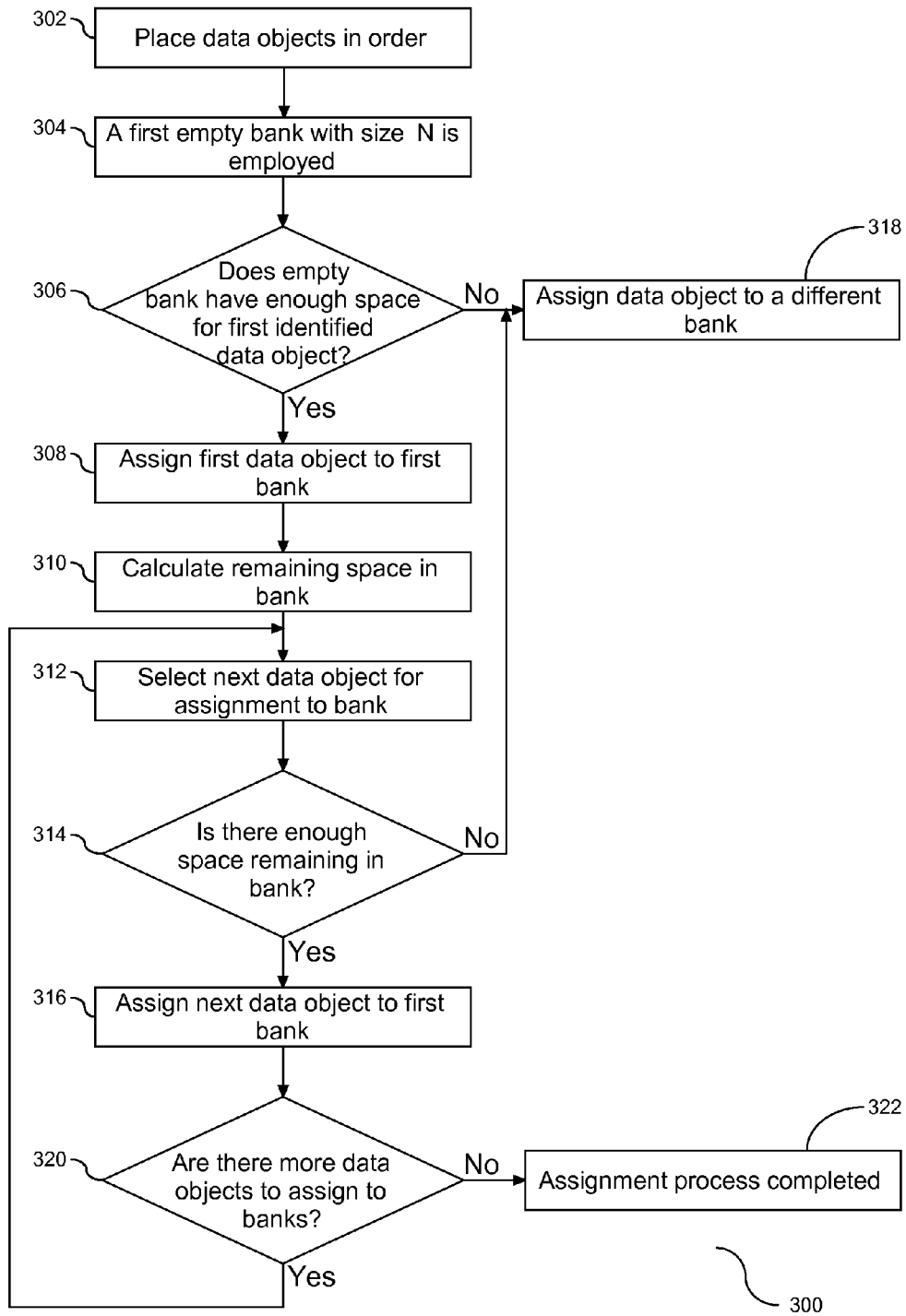
FIG. 3 is a flow chart illustrating one process for assigning columns to a wide bank.

Once the data objects have been identified, each of the data objects needs to be assigned to a bank, wherein a bank is a vertical partition of a table. In one embodiment, a bank is sized to be a machine word in width. Fields within the bank are stored in a right justified format with no padding to make up for wasted space. By definition, a wide bank may be is sized to hold multiple data objects. In one embodiment, a wide bank is 64, bits. FIG. 3 is a flow chart (300) illustrating a process for assigning data objects to a wide bank.

Initially, the data objects are placed in an order based upon size (302). The order can be ascending or descending, depending upon the instructions employed for ordering. A first empty bank having a size N is employed for assignment of data objects (304). Following step (304), it is determined if the empty bank has enough space for a first identified data object (306). A positive determination to step (306) is followed by assignment of the first data object to the first empty bank (308), and the remaining space in the first bank is calculated (310). A second data object is selected for assignment to the first bank (312), followed by a determination as to whether there is enough remaining room remaining in the first bank to accept the next data object (314). A positive response to the determination at step (314) is following by an assignment of the next data object to the first bank (316). However, a negative response to the determination at steps (314) or (306) is followed by assignment of the non-assigned data object to a different bank (318). In one embodiment, a new may bank may be created to accommodate non-assigned data objects. Following either step (316) or (318), it is determined if there are any more data objects remaining to be assigned to a bank (320). A negative response to the determination at step (320) is following by completion of the assignment process (322). Similarly, a positive response to the determination at step (320) is followed by a return to step (312), with the remaining space in all created banks evaluated. Accordingly, in the embodiment illustrated in FIG. 3, each data object is assigned to a bank based upon size of the column from which the data object originates and the space available in the banks.

Figure 4:
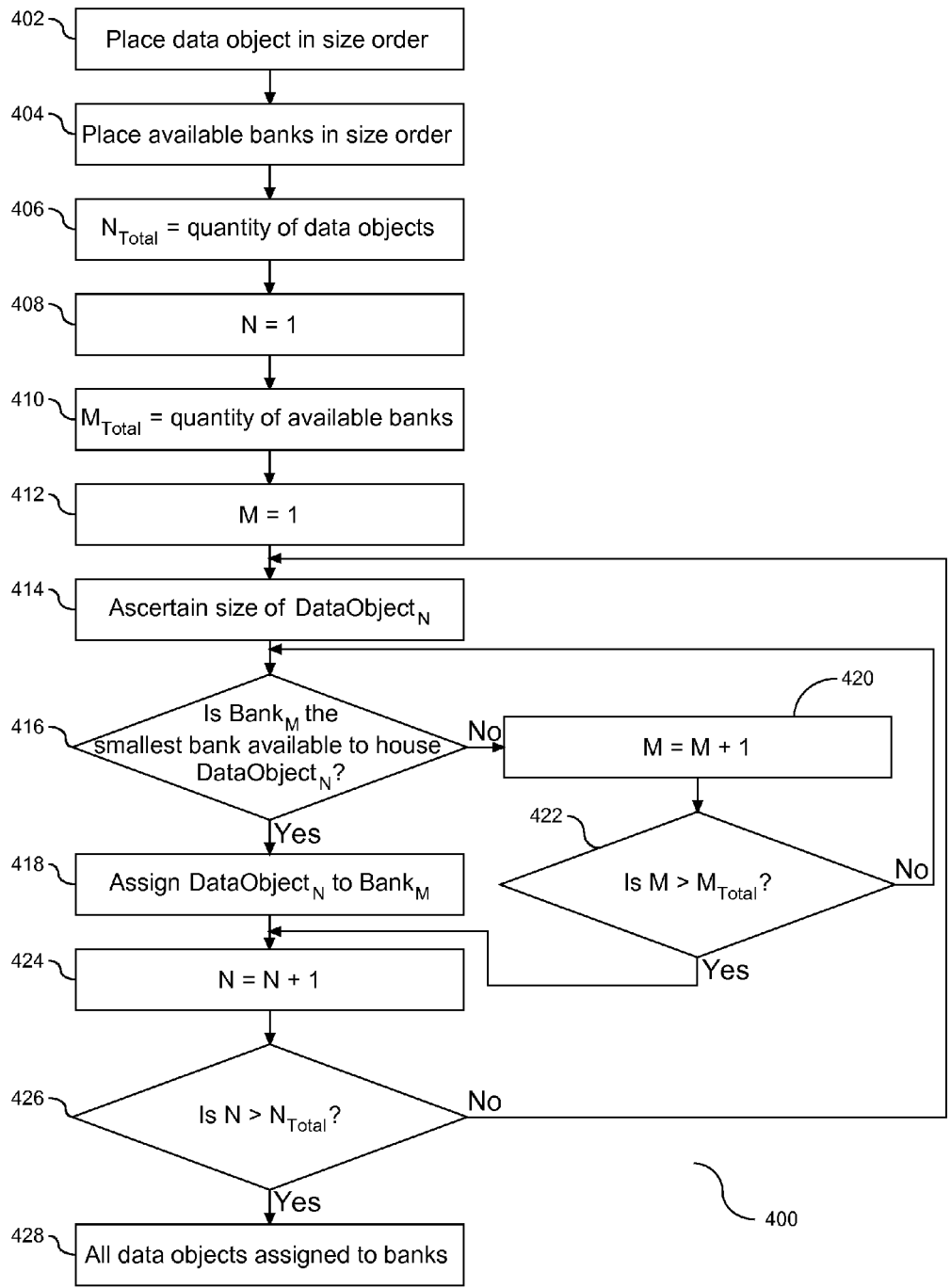
FIG. 4 is a flow chart illustrating another process for assigning columns to banks.

As noted above, there are different tools and logic that may be applied for assignment of data objects to banks. FIG. 4 is a flow chart (400) of an alternative process for assignment of data objects to banks from that shown in FIG. 3. Initially, the data objects are placed in an order based upon size (402). The order can be ascending or descending, depending upon the instructions employed for ordering. Similarly, the banks available for the hybrid layout are placed in an order based upon size (404). Similar to the order of the data objects, the banks may be order in either ascending or descending order. Each data object is assigned to the smallest bank that has enough space to hold the data object. For example, a 3, bit data object is assigned to the smallest bank, which is an 8, bit bank; a 30, bit data object is assigned to a 32, bit bank, etc. The quantity of data objects in the ordering is assigned to the variable $N_{Total}$, (406), followed by initialization of a counting variable N (408). Similarly, the quantity of available banks is assigned to the variable $M_{Total}$, (410), followed by initialization of a counting variable M (412). DataObject$_N$, is evaluated and the size of DataObject$_N$, is ascertained (414). Following step (414), it is determined if Bank$_M$ is the smallest bank available to house DataObject$_N$, (416). A positive response to the determination at step (416) is followed by assignment of DataObject$_N$, to Bank$_M$, (418). However, a negative response to the determination at step (416) is followed by an increment of the variable M (420), and a determination as to whether all of the banks have been evaluated for DataObject$_N$, (420). A negative response is followed by a return to step (416). Conversely, a positive response is followed by an increment of the variable N (424) and a determination as to whether all of the identified data objects have been evaluated for assignment to a bank (426). A negative response to the determination at step (426) is followed by a return to step (414). Conversely a positive response to the determination at step (422) indicates that all of the data objects from the identified columns have been evaluated and assigned to banks (428). The process of assigning data objects to banks in the embodiment of FIG. 4 is ideal for a query that references very few data objects, because each bank is preferably as small as it can be for the particular assigned data object.

However, the assignment process outlined in FIGS. 3 and 4 is not ideal for efficiency in processing all queries. For example, it is inefficient for queries that reference a plurality of data objects wherein the banks are not uniform in size. Some banks may be the same size as other banks, or the sizes of the banks may be different. Having banks of different sizes, i.e. widths, supports restricting assignment of narrow size data objects to narrow banks, while allowing wide banks to be used for wide data objects. The following is pseudo code for assignment of data objects to variable width banks wherein the data objects are sized based upon the earlier separation of columns:

```
1.  Create a list of Banks;
2.  Sort columns by decreasing width;
3.  For each column c of width $c_w$:
4.      Let b be the width of the smallest bank that will hold c (8 for
        widths 0-7, then 16, 32, and 64);
5.      If banks has a width of $\epsilon$ {b,2b} with space for c
6.          Place c in the left most such bank in Banks;
7.      Else, create a new bank of size b, place c in it.
```

In one embodiment, the pseudo-code above is accessorized with a tool to place data objects from the identified columns that are frequently combined in a query in the same bank. This enables the query to mitigate the quantity of banks utilized to support the query. Accordingly, as shown above, multiple variable width data objects may be placed in a single bank.

Figure 5:
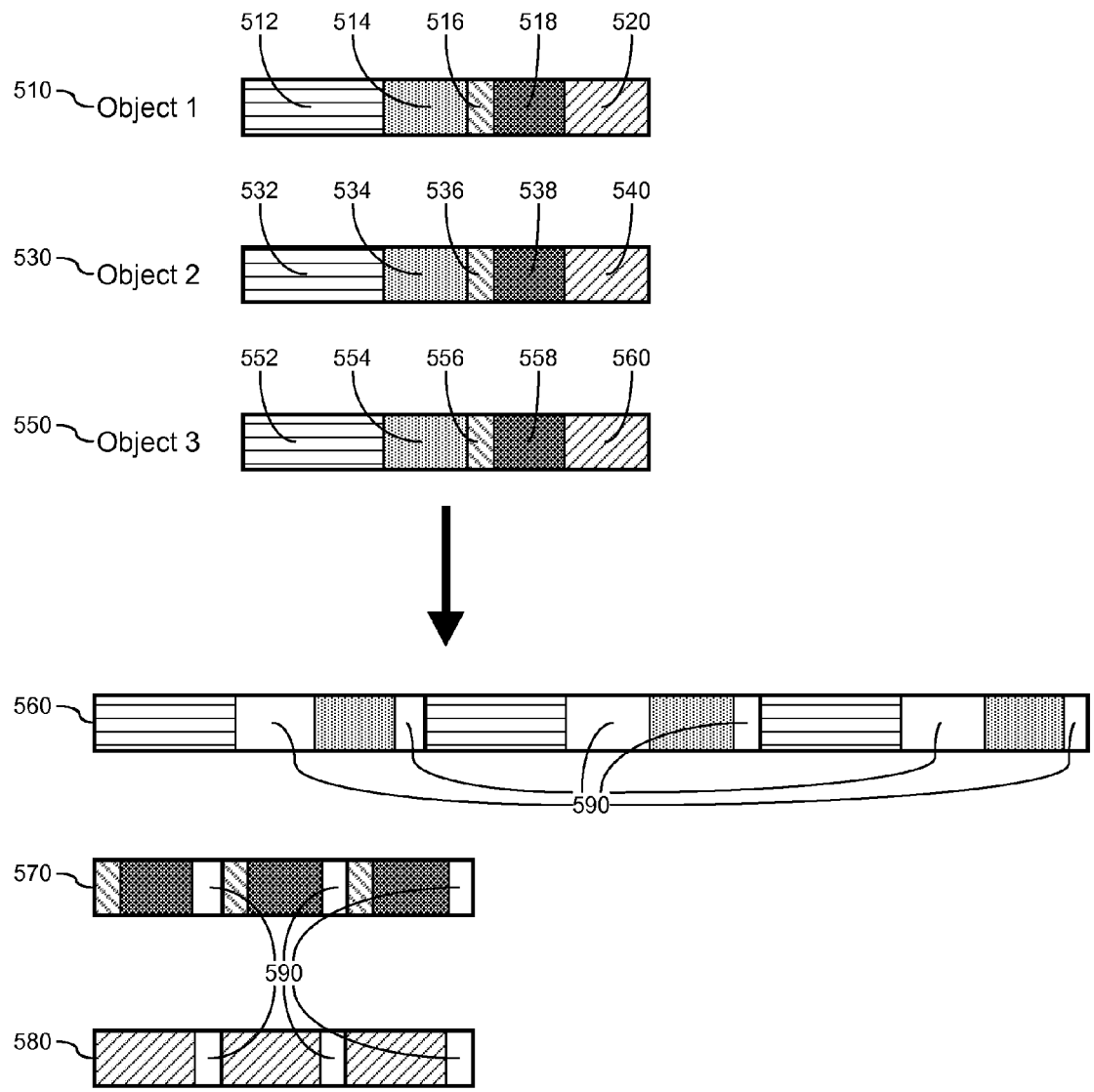
FIG. 5 is a block diagram showing multiple objects with multiple attributes, and how the objects and attributes are organized into banks according to the preferred embodiment of this invention, and is suggested for printing on the first page of the issued patent.

FIG. 5 is a block diagram (500) showing multiple objects with multiple attributes, and how the objects and attributes are organized into banks. As shown, there are three objects with five attributes in each object. More specifically, $object_1$, (510) has $tuple_1$, (512), $tuple_2$, (514), $tuple_3$, (516), $tuple_4$, (518), and $tuple_5$, (520). Similarly, $object_2$, (530) has $tuple_1$ (532), $tuple_2$, (534), $tuple_3$, (536), $tuple_4$, (538), and $tuple_5$, (540), and $object_3$, (550) has $tuple_1$ (552), $tuple_2$, (554), $tuple_3$, (556), $tuple_4$, (558), and $tuple_5$, (560). The tuples can be the same size or different sizes. In one embodiment, the tuples may be a minimum of 8, bits and a maximum of 64, bits. In this example, each of the objects (510), (530) and (550) have the same attributes. However, the invention should not be limited to each object having the same attributes. In one embodiment, multiple objects may have different attributes. Based upon the logic shown in FIGS. 2-4, the attributes of the objects are re-organized and placed into banks. The bank is a vertical partition containing a subset of the attributes. As shown, there are three banks (560), (570), and (580), with each bank storing different attributes. More specifically, $bank_1$, (560) is shown storing $tuple_1$, (512, 532, 552), and $tuple_2$, (514, 534, 554), $bank_2$, (570) is shown storing $tuple_3$, (516, 536, 556) and $tuple_4$, (518, 538, 558), and $bank_3$, (580) is shown storing $tuple_5$, (520, 540, 560). The white space (590) shown in each of the banks represents empty space in the bank. Each bank is a fixed size based upon a divisor of a machine register size of the processor. As shown in $bank_1$, (560) the two attributes assigned to the bank do not utilize the full size of the bank. Accordingly, the placement of data objects into banks shown herein places one or more attributes into each bank, with the banks laid out in a row-major characteristic.

Figure 6:
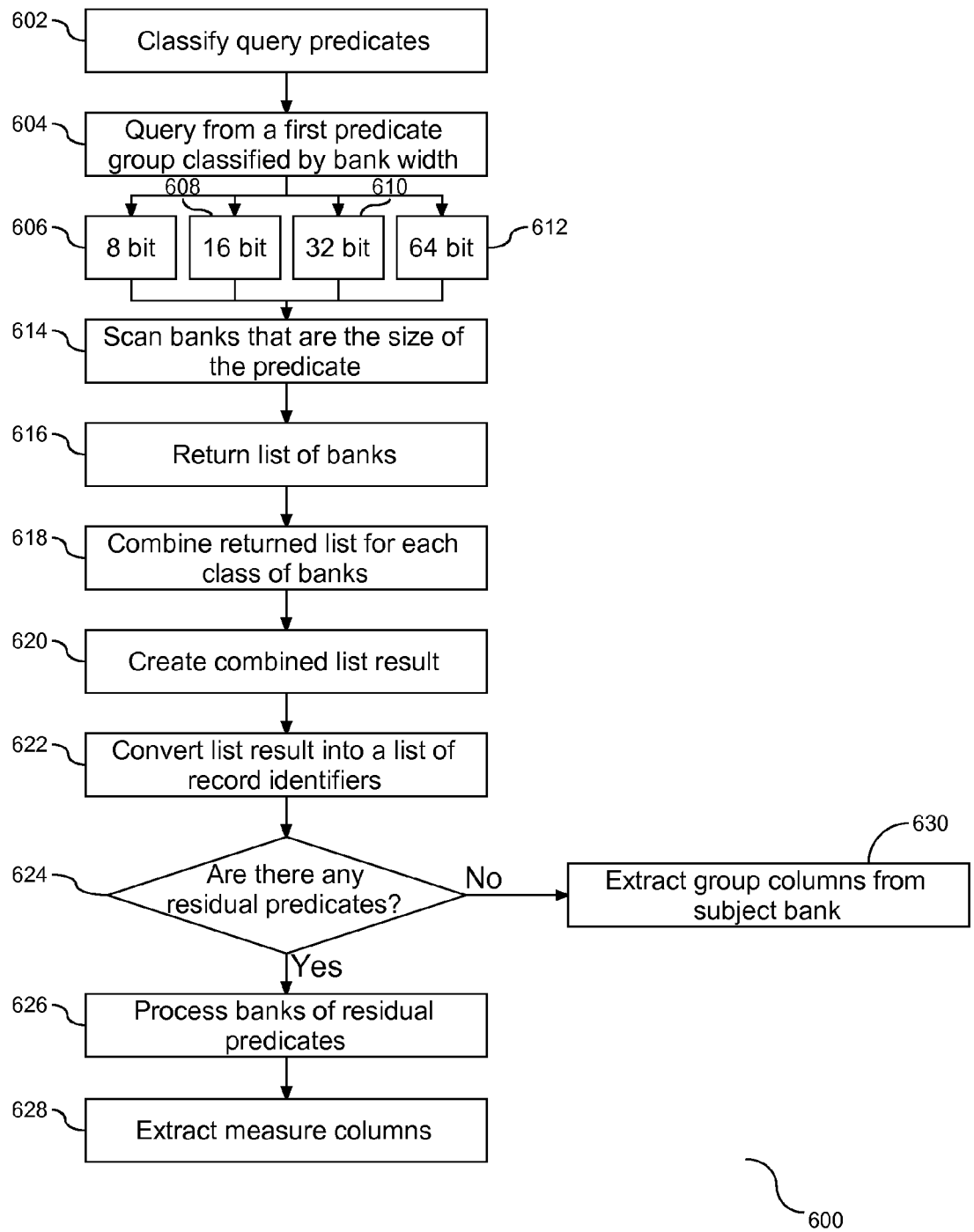
FIG. 6 is a flow chart illustrating a process for evaluating predicates of a query.

As noted above, there is different logic that may be employed to place the data objects identified in the non-measure columns into banks. Any one of the assignment logic may be employed as long as the identified data objects concatenated together fit within the respective bank size. Once the assignment of data objects to banks has been conducted, the original table format is placed in a new layout. FIG. 6 is a flow chart (600) illustrating a process for evaluating predicates of a query by accessing only the banks originating from the non-measure columns. Initially, the predicates of a query are classified (602). In one embodiment, two groups of query predicates are defined. A first group of predicates may be classified for employment of one aspect of query processing, and a second group of predicates for employment of another aspect of query processing. For each query that employs a predicate from the first group, the subject predicate(s) is classified by the width of the bank to which they apply (604). More specifically, at step (604) the bank to which the predicate belongs and the size of the subject bank is ascertained. Based upon the relationship of the bank size to a register, the subject predicate is an 8, bit predicate (606), a 16, bit predicate (608), a 32, bit predicate (610), or a 64, bit predicate (612). The banks that are the size to which the predicate belongs is scanned (614). In one embodiment, a list of banks that satisfy the scan at step (616) is returned. The results for each class of banks is then combined (618). For example, in one embodiment, two banks may satisfy two predicates. In one embodiment, a bitmap is employed to represent the resulting combination of banks. Following step (618) the results for the entire subject banks are combined into a single saturated result creating a combined list result (620). If all of the banks are the same size, then the result of the predicate evaluation for each bank is in the same offset within the register. The results of the predicate evaluation can be directly combined using bitwise AND for conjunctive predicate operations, or bitwise OR for disjunctive predicate operations. The combined result contains the result of predicate evaluation for each tuple. In one embodiment, the maximum size of the combination at step (620) is the largest bank for which there were predicates submitted with the query. Similarly, if the banks for the predicate evaluation are not the same size, the result of the predicate evaluation on each bank may be converted into a bitmap, which may be appended to bitmaps of other banks having different sizes. The saturated results from step (620) are then converted into a list of record identifiers for the qualifying records (622). Accordingly, the first part of the query processing based upon the bank layout of the data objects identified in the non-measure columns includes, separating query predicates into two separate classes and processing banks pertaining to one class of the predicates, and creating lists, i.e. bitmaps, of qualifying record identifiers for the subject query predicates.

Following the separation by way of predicates, the query may then be processed by the subject of the query. The remaining steps of the flow chart demonstrate the characteristics of an aggregate query. However, the invention should not be limited to an aggregate query, as the banked layout supports other forms of queries. Following step (622), it is determined if there are any residual predicates in the query that were not the subject of the first class of predicates, i.e. the second class of predicates, (624). A positive response to the determination at step (624) is followed by processing banks that are the subject of the second class of predicates (626), including accessing the subject banks for record identifiers, and producing a new record identifier list of qualifying records. Following step (626), the measure columns are extracted from the subject banks by the record identifier to complete the query processing (628). Conversely, upon a negative response to the determination at step (624), grouping columns are extracted from the subject banks by the record identifier(s) to satisfy the query (630). Accordingly, the subject columns of the predicates are extracted from the banks using record identifiers for each record for an aggregation query.

The evaluation of predicates on the data objects identified in the non-measure columns supports efficient predicate evaluation on blocks of tuples. As noted above, each bank is sized to be a divisor of the register size. When entries in the bank are loaded into registers, each register has a set quantity of tuples in the bank. Instructions, including SIMD instructions, are employed to apply the predicates of the query to all the tuples in parallel.

As shown in FIGS. 1-6, data may be re-organized into a hybrid structure in the form of banks, wherein measure columns and non-measure columns are separated, and may be separately processed in response to submission of a query.

Figure 7:
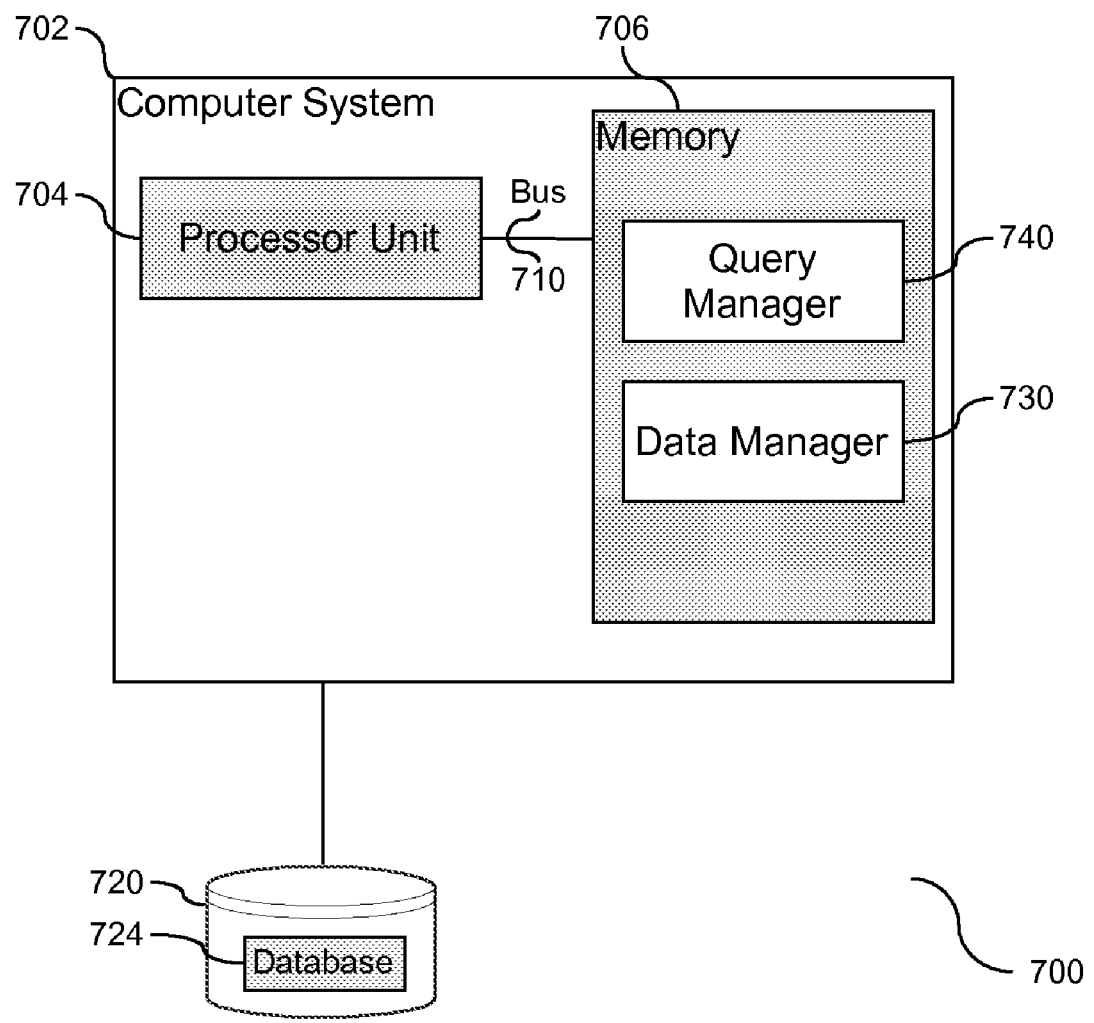
FIG. 7 is a block diagram illustrating a set of tools for modifying the data organization and processing a query responsive to the organization

FIG. 7 is a block diagram (700) illustrating a set of tools for modifying the data organization and processing a query responsive to the organization. As shown, a computer system (702) is provided with a processor unit (704) coupled to memory (706) by a bus structure (710). Although only one processor unit (704) is shown, in one embodiment, more processor units may be provided in an expanded design. The system (702) is shown in communication with storage media (720) configured to house a database (724).

A data manager (730) is provided local to the computer system and in communication with the storage media (720). The data manager (730) is responsible for separating the data object into parts based upon the columns of the associated database table (not shown). It is recognized in the art that databases include fact tables and dimension tables. In one embodiment, the data objects are separated based upon their classification into the fact or dimension tables. In addition to separating the data objects, the data manager (730) organizes and stores the separated data objects into banks. A query manager (740) is provided in communication with the manager (730). The query manager (740) is responsible for executing a query on the data objects that have been re-organized by the data manager.

In one embodiment, the data manager (730) and the query manager (740) may reside in memory (706) local to the computer system (702). However, the invention should not be limited to this embodiment. For example, in one embodiment, the data manager (730) and the query manager (740) may reside as hardware tools external to local memory (706), or they may be implemented as a combination of hardware and software. Similarly, in one embodiment, the managers (730) and (740) may reside on a remote system in communication with the storage media (720). Accordingly, the managers may be implemented as a software tool or a hardware tool to convert a collection of multi-attribute data objects into a modified representation, and process a query in response to the modified representation.

In one embodiment, the invention is implemented in software, which includes but is not limited to firmware, resident software, microcode, etc. The invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

Embodiments within the scope of the present invention also include articles of manufacture comprising program storage means having encoded therein program code. Such program storage means can be any available media which can be accessed by a general purpose or special purpose computer. By way of example, and not limitation, such program storage means can include RAM, ROM, EEPROM, CD-ROM, or other optical disk storage, magnetic disk storage or other magnetic storage devices, or any other medium which can be used to store the desired program code means and which can be accessed by a general purpose or special purpose computer. Combinations of the above should also be included in the scope of the program storage means.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, random access memory (RAM), read-only memory (ROM), a rigid magnetic disk, and an optical disk. Current examples of optical disks include compact disk B read only (CD-ROM), compact disk B read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks.

The software implementation can take the form of a computer program product accessible from a computer-usable or computer-readable medium providing program code for use by or in connection with a computer or any instruction execution system.

In one embodiment, the invention is implemented in software, which includes but is not limited to firmware, resident software, microcode, etc. The invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

Advantages of the Exemplary Embodiment Over the Related Art

Multi-attribute data is re-organized on computer memory or disk based upon inherent characteristics of the data. Measure columns and non-measure columns of the data are separated, with data objects of the non-measure columns re-organized and assigned to banks. A query may be executed on the data to extract one or more columns from the bank using a record identifier for each record that is the subject of the query.

There is different logic that may be applied to assign data objects to banks. The assignment may be based upon the size of the subject data objects, the relationship of the data objects, etc. To properly assign the data objects to the banks, the attributes of the subject data objects are measured so that the data objects may be placed in a bank sized for a respective register. A wide row layout is an example where multiple data objects may be assigned to a single bank. The wide row layout may be efficient to process a query that employs all or most of the data objects assigned to the bank. However, queries that access only a small number of fields have to unnecessarily scan and the whole 64, bit bank. Another configuration is an aligned column layout where each data object identified in each column is placed in the smallest bank size that will hold the data object. The remaining unused portions of the bank are left empty. This configuration gets poor compression due to the empty space, but may be desirable for queries that access only a small number of data objects. For example, a query that accesses a 3, bit field and a 14, bit field would have to scan and process an 8, bit bank and a 16, bit bank. A thin row layout is a configuration where each data object is placed in the smallest size bank that can hold the data object. In other words, each field goes into its own bank. Any unused portions of the bank redundantly store copies of the used portions of the bank. During a query processing, a scan of the bank will never scan any more bits of a data object that a pure column store, and in many cases will scan even less. More specifically, the thin row layout will significantly enhance processing of a query. A medium row layout support packing banks with data objects of various sizes. In one embodiment, a column that is more than twice the minimum size needed to hold the associated data object is not placed in the bank. For example, a 9, bit data object may be placed into a 16, bit bank or a 32, bit bank, but not into a 64, bit bank. The medium row layout improves query processing and performance by up to 30%. Accordingly, based upon the characteristics of the query, data objects may be organized into one or more banks based upon different logic, and different performance of the query processing.

Alternative Embodiments

It will be appreciated that, although specific embodiments of the invention have been described herein for purposes of illustration, various modifications may be made without departing from the spirit and scope of the invention. In particular, the banked layout of data objects may be employed with different styles of query processing to provide enhanced performance of the associated query processing. Accordingly, the scope of protection of this invention is limited only by the following claims and their equivalents.

We claim:

1. A method for representing a database of multiple data objects on computer memory, comprising:
   separating a data object with multiple attributes into at least two parts—a first part having measure columns laid out in row-major order and a second part having non-measure columns laid out in a vertical partition, said measure and non-measure columns representing different characteristics of a database table;
   creating a hybrid layout of said database table by organizing attributes of said first and second parts into at least two separate banks, with the bank being a vertical partition containing a subset of the attributes;
   sizing each bank as a divisor of a machine register size; and
   storing said first and second parts in the at least two separate banks.

2. The method of claim 1, further comprising sizing each bank as a power of two of a number of bits corresponding to a machine word size.

3. The method of claim 1, wherein a size of the bank is dictated by hardware specification.

4. The method of claim 1, further comprising separating a measure column of the table from the non-measure column of the table, including placing at least one measure column in a first bank and placing at least one data object from the non-measure column in a second bank, wherein said first bank is separate from said second bank.

5. The method of claim 1, further comprising placing multiple data objects identified in the non-measure columns in a single bank with optional spacing in the bank between adjacent objects.

6. The method of claim 1, further comprising placing data objects from commonly aggregated columns of the table into a single bank.

7. The method of claim 1, further comprising storing a data attribute redundantly in multiple banks for one or more of the data attributes.

8. The method of claim 1, further comprising storing corresponding separated parts of all data objects together in a bank for objects within a page.

9. The method of claim 1, further comprising executing a query on the data objects, the execution comprising:
   evaluating query conditions on each object;
   forming a list of the objects for each bank that pass the query conditions on attributes that are stored in that bank; and
   merging the lists from each bank to form a list of objects that pass all query conditions.

10. The method of claim 9, further comprising representing the formed list of objects as a bitmap.

11. The method of claim 9, further comprising filtering the list by applying query conditions that include attributes from multiple banks.

12. The method of claim 9, wherein the lists are used to fetch commonly aggregate columns for those objects in the list, and aggregate the values in those columns.

13. An article configured to represent a database of multiple data objects on computer memory, the article comprising:
   a computer-readable medium including computer program instructions and to process a query responsive to the configuration, the instructions comprising:
     instructions to separate a data object with multiple attributes into at least two parts —a first part having measure columns laid out in row-major order and a second part having non-measure columns laid out in a vertical partition, said measure and non-measure columns representing different characteristics of a database table;
     instructions to create a hybrid layout of said database table by organizing attributes of said first and second parts into at least two separate banks, with the bank being a vertical partition containing a subset of the attributes;
     instructions to size each bank as a divisor of a machine register size; and
     instructions to said first and second parts in the at least two separate banks.

14. The article of claim 13, further comprising instructions to separate a measure column of the table from the non-measure column of the table, including placement of at least one measure column in a first bank and placement of at least one data object from the non-measure column in a second bank, wherein said first bank is separate from said second bank.

15. The article of claim 13, further comprising instructions to place multiple data objects from the non-measure columns in a single bank with optional spacing in the bank between adjacent data objects.

16. The article of claim 13, further comprising instructions to place commonly aggregated data objects of the table subject to a query into a single bank.

17. The article of claim 13, further comprising instructions to execute a query on the data objects, the query comprising:
   evaluating query conditions on each object;
   forming a list of the objects for each bank that pass predicates of the query conditions; and
   merging the lists from each bank to form a list of objects that pass all predicates.

18. The article of claim 17, further comprising instructions to represent the formed list of objects as a bitmap.

19. The article claim 17, wherein the lists are used to fetch commonly aggregate columns for those objects in the list, and aggregate the values in those columns.

20. A method for representing a database of multiple data objects on computer memory, comprising:

separating a data object with multiple attributes into at least two parts—a first part having measure columns laid out in row-major order and a second part having non-measure columns laid out in a vertical partition, said measure and non-measure columns representing different characteristics of a database table, said measure columns used by a query for aggregation and not for predicate evaluation or group-by processing, and said non-measure column identifiable by their presence in a dimension table of said database;

creating a hybrid layout of said database table by organizing attributes of said first and second parts into at least two separate banks, with the bank being a vertical partition containing a subset of the attributes;

sizing each bank as a divisor of a machine register size; and storing said first and second parts in the at least two separate banks.

\* \* \* \* \*